Feb. 28, 1939.  W. GERB  2,148,937
APPARATUS FOR DAMPING VIBRATIONS
Filed Aug. 17, 1936
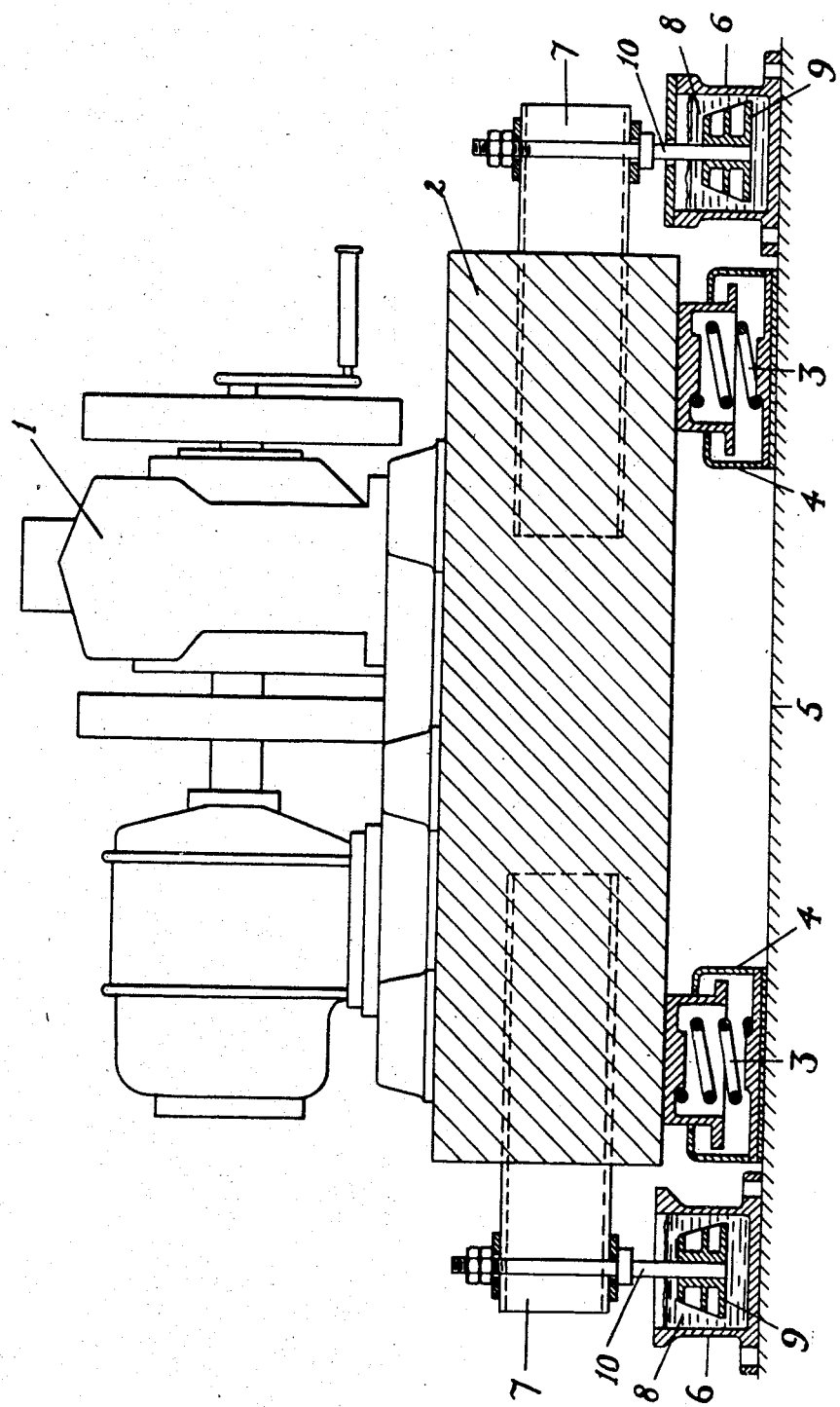
Inventor.
William Gerb
By Spear, Donaldson & Hall
Attys.

Patented Feb. 28, 1939

2,148,937

UNITED STATES PATENT OFFICE 2,148,937

APPARATUS FOR DAMPING VIBRATIONS

William Gerb, Berlin, Germany

Application August 17, 1936, Serial No. 96,555
In Germany August 21, 1935

2 Claims. (Cl. 188—96)

This invention relates to a method of and apparatus for reducing the movements of machines due to resilient suspension of the latter.

It is an object of the invention to provide a shock-absorbing means in which the movements referred to are reduced to a minimum.

A further object is to provide a method and means by which the said movements may be effectively damped without impairing the action of the shock-absorbing means.

A further object is to provide an effective movement damping device, which is cheap to produce and may also be fitted to any existing resiliently mounted or suspended unit or aggregate.

It has previously been proposed to employ hydraulic damping means for limiting such movement in which a liquid is forced through a usually regulable aperture, wherein the extent of damping is determined by the friction of the liquid against the surrounding walls.

According to the invention, I provide a method of damping movements resulting from the resilient suspension of machines which consists in transmitting the movements of a resiliently suspended machine to a very viscous plastic and inelastic material located in an open container, which material will not separate from the walls of the container or other confining surfaces as a result of said movement.

My invention is also directed to apparatus for carrying this method into effect and thus I provide an apparatus for damping movements resulting from the resilient suspension comprising an open container and a very viscous or plastic and inelastic material located in said open container and means for transmitting the movement of the machine to said viscous or plastic material.

In the arrangement according to the invention I employ as damping material extremely viscous or plastic substances, which have the property of submitting to a permanent variation in form but exhibit a certain power of flow before separating or tearing apart. In other words I do not utilize for the damping effect the friction of the damping material against the surrounding walls, but the cohesive or adhesive forces of this material.

The invention will now be described more fully with reference to the accompanying drawing, which is a longitudinal sectional view taken through a complete plant, including the vibration-damping means according to the invention.

Referring now to the drawing, I represents a Diesel aggregate, which is supported in the known fashion by a concrete base 2, which in turn is carried by springs 3 suitably enclosed in casings 4, in order that disturbing vibrations or concussive effects will not be transmitted to the surroundings, i. e., the bed 5. On the bed 5 there are provided one or more pots or containers 6 rigidly secured thereto and adapted to contain an extremely viscous liquid or plastic substance acting as vibration-damping material.

In the concrete base 2 there are embedded, one for each pot, U-shaped irons 7. In the pots 6, surrounded by the vibration-damping material 8, there are provided one or more plates 9, which are connected with the U-shaped members 7 by rods 10. The embodiment of the plates 9 as shown in the drawing permits of adjustment of the degree of damping, but I may also employ single plates which in the majority of cases, particularly if the vibrations are more or less of a constant nature, will be equally effective. The pots 6 are either open at the top, as shown in the left hand pot in the drawing, or they may be furnished with a cover, as shown in the case of the right hand pot, which cover then possesses an aperture for the passage of the rods 10, this aperture being of any desired size so that free access will be had to the pots by the atmosphere.

The damping material consists either of an extremely viscous liquid or a plastic substance which has the property of submitting to a permanent variation in form, but exhibits a certain power of flow before tearing apart. Substances of this kind are, for example, syrup or thick juices, the substance known as plasticine, or a heavy and thick mineral oil with or without the addition of asphalt or other substances adapted to vary its consistency. Thus, for example, a heavy mineral oil containing approximately 16% hard asphalt and having a viscosity of about 15 E° at 100° C. will be found suitable in numerous instances, for example in machine shops and engine rooms, as the viscosity of this substance will not vary to any appreciable extent in the comparatively small range of variation in the prevailing temperature in either winter or summer. It will be obvious, of course, that the material selected will be adapted to the particular conditions of use.

Thus, for example, the material employed in a very hot country will differ to that selected for use in very cold countries, either in its natural form or by reason of suitable additions for the purpose of varying the consistency as desired.

Whatever the material employed, the same should be of such nature that when the plate 9 is acted upon by the vibrations emanating from the springs 3 it will not tear away either from the plate or from the wall of the pot but by reason of its cohesive or adhesive properties will effectively damp the vibrations. For this purpose a certain space will require to exist between the edge of the plate and the wall of the pot, which space in turn will be governed to a certain extent although not exclusively by the exact nature of the material. Whilst the space, as stated, requires to have a certain minimum size its limitation in the opposite sense is not so exactly defined, and the plate 9 merely requires to be of such size that it can effectively co-operate with the damping material.

With an arrangement of this kind the damping device is unable to exert any reactionary forces, at least of an appreciable nature, on the system to be damped, so that the damping effect is particularly effective and the vibrations are reduced to a minimum.

It will be understood that no limitation is made to the specific form of embodiment shown in the drawing, and that numerous modifications are quite possible within the meaning of the above description and the annexed claims without departing from the spirit of the invention.

What I claim as new and desire to secure by Letters Patent is:

1. In apparatus for damping vibrations emanating from a resiliently suspended body, and in combination, a pot having an opening providing for free access of atmosphere thereto, an inelastic damping material of highly viscous and plastic character in said pot characterized by its capacity to assume a permanent variation in form, and its inability to exert reactionary forces, and by its reluctance to tear apart within itself or from the surfaces with which it contacts, the cohesive and adhesive forces of said material being such as to exceed the forces transmitted thereto as a result of movement of the resiliently suspended body, a plate disposed in said damping material in said pot, so as to be capable of movement in all directions, said plate being of smaller diameter than the inner diameter of said pot, and rigid means extending through and of substantially smaller diameter than the opening in the pot, and capable of movement in all directions in relation to said pot, and connecting said plate with the vibrating resiliently suspended body, said damping material providing a connection having cohesion and adherent to the pot and plate.

2. Apparatus according to claim 1 in which the space between the said plate and the wall of the pot and the thickness of the mass of the damping material in said space is sufficient to provide for adequate cohesion and adhesion of the damping material to prevent its tearing away from the plate or from the pot.

WILLIAM GERB.